US012484837B2

(12) United States Patent
Carruthers

(10) Patent No.: US 12,484,837 B2
(45) Date of Patent: Dec. 2, 2025

(54) SKIN TORSIONOMETER

(71) Applicant: Carruthers Instruments Inc., Vancouver (CA)

(72) Inventor: Jean Carruthers, Vancouver (CA)

(73) Assignee: CARRUTHERS INSTRUMENTS INC., Vancouver (CA)

(*) Notice: Subject to any disclaimer, the term of this patent is extended or adjusted under 35 U.S.C. 154(b) by 617 days.

(21) Appl. No.: 17/054,103

(22) PCT Filed: Jun. 24, 2020

(86) PCT No.: PCT/CA2020/000075
§ 371 (c)(1),
(2) Date: Nov. 9, 2020

(87) PCT Pub. No.: WO2020/227809
PCT Pub. Date: Nov. 19, 2020

(65) Prior Publication Data
US 2021/0196185 A1 Jul. 1, 2021

Related U.S. Application Data

(63) Continuation-in-part of application No. 16/409,904, filed on May 13, 2019, now abandoned.

(60) Provisional application No. 62/670,079, filed on May 11, 2018.

(51) Int. Cl.
*A61B 5/00* (2006.01)

(52) U.S. Cl.
CPC ............ *A61B 5/442* (2013.01); *A61B 5/0002* (2013.01); *A61B 5/0055* (2013.01); *A61B 5/742* (2013.01); *A61B 2562/0238* (2013.01)

(58) Field of Classification Search
CPC ...................................................... A61B 5/442
See application file for complete search history.

(56) References Cited

U.S. PATENT DOCUMENTS

| | | | |
|---|---|---|---|
| 4,157,472 A * | 6/1979 | Beck, Jr. ............. | A61B 6/0435 378/194 |
| 4,396,025 A | 8/1983 | de Rigal et al. | |
| 4,813,412 A | 3/1989 | Yamazaki et al. | |
| 4,947,851 A | 8/1990 | Sarvazyan et al. | |
| 6,210,340 B1 | 4/2001 | Amano et al. | |

(Continued)

FOREIGN PATENT DOCUMENTS

| | | |
|---|---|---|
| CA | 2316912 C | 9/2009 |
| DE | 4229549 A1 | 3/1994 |

(Continued)

OTHER PUBLICATIONS

Leveque et al., "Influence of Ageing on the in Vivo Extensibilty of Human Skin at a Low Stress," 1980, Dermatological Research, Res 269, pp. 127-135 (Year: 1980).*

(Continued)

*Primary Examiner* — Aurelie H Tu
(74) *Attorney, Agent, or Firm* — Todd A. Rattray; Oyen Wiggs Green & Mutala LLP

(57) ABSTRACT

Skin torsionometers, methods and systems for using such skin torsionometers, and systems including a skin torsionometer, computing device configured to capture images, and an application (app) for determining the tautness of skin are described herein.

16 Claims, 9 Drawing Sheets

(56) References Cited

U.S. PATENT DOCUMENTS

| | | | |
|---|---|---|---|
| 6,926,681 B1* | 8/2005 | Ramey | A61H 9/005 |
| | | | 601/7 |
| 7,857,756 B2 | 12/2010 | Warren et al. | |
| 8,360,973 B2 | 1/2013 | Bazin et al. | |
| 9,265,461 B2 | 2/2016 | Hunter et al. | |
| 10,117,617 B2 | 11/2018 | Cantu et al. | |
| 10,117,721 B2 | 11/2018 | Tripathi et al. | |
| 10,127,661 B2 | 11/2018 | Wang et al. | |
| 2002/0029924 A1 | 3/2002 | Courage | |
| 2002/0065452 A1 | 5/2002 | Bazin et al. | |
| 2003/0005781 A1 | 1/2003 | Oba et al. | |
| 2004/0254546 A1 | 12/2004 | Andre | |
| 2006/0052719 A1* | 3/2006 | Ruvolo | A61B 5/442 |
| | | | 600/552 |
| 2007/0173710 A1 | 7/2007 | Petisce et al. | |
| 2008/0077053 A1 | 3/2008 | Epstein et al. | |
| 2009/0017147 A1* | 1/2009 | Lintner | A61K 8/9767 |
| | | | 424/780 |
| 2010/0004624 A1 | 1/2010 | Hunter | |
| 2010/0010346 A1* | 1/2010 | Greenleaf | A61B 5/442 |
| | | | 600/438 |
| 2010/0254581 A1 | 10/2010 | Neeser et al. | |
| 2011/0319792 A1 | 12/2011 | Lim et al. | |
| 2013/0079643 A1 | 3/2013 | Korichi et al. | |
| 2013/0103119 A1* | 4/2013 | Yamanaka | A61N 1/06 |
| | | | 607/62 |
| 2015/0045631 A1 | 2/2015 | Ademola | |
| 2015/0126962 A1* | 5/2015 | Freeman | A61M 5/2425 |
| | | | 604/506 |
| 2015/0230863 A1 | 8/2015 | Youngquist et al. | |
| 2016/0066833 A1 | 3/2016 | Yaroslavsky et al. | |
| 2016/0174878 A1 | 6/2016 | Grove et al. | |
| 2017/0095195 A1 | 4/2017 | Hunter et al. | |
| 2017/0224280 A1 | 8/2017 | Bozkurt et al. | |
| 2017/0224520 A1 | 8/2017 | Karasahin | |
| 2017/0270667 A1 | 9/2017 | Khazaeni et al. | |
| 2018/0000348 A1* | 1/2018 | Bishara | A61B 5/6806 |
| 2018/0011536 A1* | 1/2018 | Kim | A61B 5/1107 |
| 2018/0103852 A1* | 4/2018 | Dagdeviren | A61B 5/442 |
| 2020/0008715 A1* | 1/2020 | Schroeck | A61B 5/6831 |
| 2020/0173765 A1* | 6/2020 | Stamey | G01B 7/12 |

FOREIGN PATENT DOCUMENTS

| | | |
|---|---|---|
| DE | 102013225621 A1 | 4/2014 |
| EP | 0255809 A1 | 2/1988 |
| EP | 1513445 B1 | 9/2006 |
| EP | 2301436 A1 | 3/2011 |
| EP | 3366201 A1 | 8/2018 |
| JP | 5775635 A | 5/1982 |
| JP | 2006263128 A | 10/2006 |
| JP | 2009153727 A | 7/2009 |
| JP | 2009240374 A | 10/2009 |
| JP | 2009268640 A | 11/2009 |
| JP | 2012161371 A | 8/2012 |
| KR | 100400870 B1 | 10/2003 |
| WO | 2004021882 A2 | 3/2004 |
| WO | 2005064311 A1 | 7/2005 |
| WO | 2007058966 A1 | 5/2007 |
| WO | WO-2009027898 A1 * | 3/2009 ........... A61B 5/0055 |
| WO | 2011028719 A2 | 3/2011 |

OTHER PUBLICATIONS

Escoffier, Catherine, et al., Age-Related Mechanical Properties of Human Skin: An In Vivo Study, 1989, The Journal for Investigative Dermatology, Inc., 0022-202X(89), pp. 353-357 (Year: 1989).*

PCT/CA2020/000075, Carruthers, Jun. 24, 2020, PCT International Search Report, 3 pages.

PCT/CA2020/000075, Carruthers, Jun. 24, 2020, PCT Written Opinion, 3 pages.

Baryza et al., "The Vancouver Scar Scale: An Administrative Tool and Its Interrater Reliability", (1995).

Boyce et al., "Assessment With the Dermal Torque Meter of Skin Pliability After Treatment of Burns With Cultured Skin Substitutes", (2000).

Brenner et al., "Principals of Micro Torque Measurement—An Overview", (2003).

Clancy et al., "A new device for assessing changes in skin viscoelasticity using indentation and optical measurement", (2010).

"DTM310 Dermal Torque Meter"—Website found at http://www.dutech.org/dia-stron-dtm310.html; we page archive Mar. 28, 2018.

Jacquet et al., "Intra-and inter-individual variability in the mechanical properties of the human skin from in vivo measurements on 20 volunteers", (2017).

Kajs et al., "Review of the instrumental assessment of skin: Effects of cleaning products", (1991).

Kim et al., "Use of SkinFibrometer to measure skin elasticity and its correlation with Cutometer and DUB Skinscanner", (2018).

\* cited by examiner

SKIN TORSIONOMETER

CROSS-REFERENCE TO RELATED APPLICATIONS

This application claims priority from U.S. Provisional No. 62/670,079 entitled "Skin Torsionometer" filed on May 11, 2018, which is hereby incorporated by reference in its entirety.

GOVERNMENT INTERESTS

Not applicable

PARTIES TO A JOINT RESEARCH AGREEMENT

Not applicable

INCORPORATION OF MATERIAL ON COMPACT DISC

Not applicable

BACKGROUND

Not applicable and laptop

SUMMARY OF THE INVENTIO

Various embodiments are directed to a device for determining the elasticity and tautness of skin including a housing, a torsionometer rotationally attached to the housing having a lower surface designed and configured to adhere to skin, a sensor configured to monitor rotation velocity of the torsionometer operably connected to the torsionometer and contained within the housing. In some embodiments, the sensor may be selected from optical sensors, cameras, video cameras, smart phones, optical encoders, and the like and combinations thereof, and in certain embodiments, the sensor may be an optical encoder. In some embodiments, the device may further include a processor operably connected to the sensor, a display, indicator lights, buttons, hardware for transmitting data, and the like and combinations thereof. In various embodiments, the hardware for transmitting data may be selected from cords, connectors, dongles, WiFi hardware, Bluetooth hardware, or other wireless network hardware, and combinations thereof.

In some embodiments, the device may further include a processor operably connected to the sensor, and the processor may be configured to determine the Young's modulus of the skin. In some embodiments, the torsionometer may be substantially cylindrical in shape, and in some embodiments, the torsionometer may include a rotatable shaft operably connected to the torsionometer and the sensor. In some embodiments, the device may include a vacuum pump operably connected to the torsionometer and configured to adhere the torsionometer to the skin by suction, and in some embodiments, a vacuum gauge operably connected to the vacuum pump and operably connected to the processor, and the processor may be configured to calculate a density of skin adhered to the torsionometer.

Other embodiments are directed to a method for measuring the elasticity or tautness of skin by measuring recoil speed associated with return of twisted skin to a natural position. In some embodiments, the method may include calculating a Young's modulus of the skin based on the recoil speed, and in some embodiments, the method may include measuring a degree of rotation of the twisted skin, measuring an angular velocity of the return of the twisted skin to a natural position, measuring an acceleration of the return of the twisted skin to a natural position, and the like and combinations thereof. In such embodiments, the method may be carried out on facial skin, arm skin, leg skin, and the like and combinations thereof.

DESCRIPTION OF THE DRAWINGS

Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known process operations have not been described in details so as to not unnecessarily obscure the present invention.

DETAILED DESCRIPTION

Figure 1:
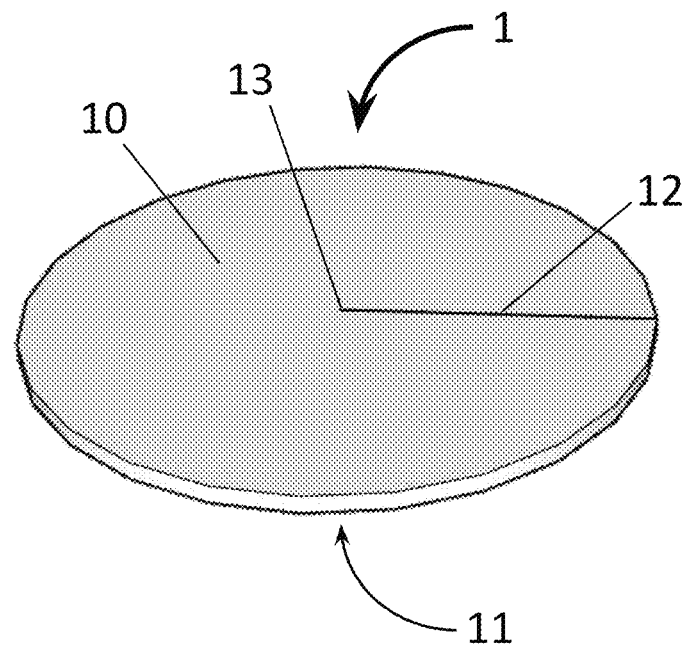
FIG. 1 is a diagram illustrating one example of a skin torsionometer embodied by the invention.

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

Where a range of values is provided, it is intended that each intervening value between the upper and lower limit of that range and any other stated or intervening value in that stated range is encompassed within the disclosure. For example, if a range of 1 µm to 8 µm is stated, 2 µm, 3 µm, 4 µm, 5 µm, 6 µm, and 7 µm are also intended to be explicitly disclosed, as well as the range of values greater than or equal to 1 µm and the range of values less than or equal to 8 µm.

All percentages, parts and ratios are based upon the total weight of the topical compositions and all measurements made are at about 25° C., unless otherwise specified.

The singular forms "a," "an," and "the" include plural referents unless the context clearly dictates otherwise. Thus, for example, reference to a "polymer" includes a single polymer as well as two or more of the same or different polymers; reference to an "excipient" includes a single excipient as well as two or more of the same or different excipients, and the like.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

The term "patient" and "subject" are interchangeable and may be taken to mean any living organism which may be treated with compounds of the present invention. As such, the terms "patient" and "subject" may include, but is not limited to, any non-human mammal, primate or human. In some embodiments, the "patient" or "subject" is a mammal, such as mice, rats, other rodents, rabbits, dogs, cats, swine, cattle, sheep, horses, primates, or humans. In some embodiments, the patient or subject is an adult, child or infant. In some embodiments, the patient or subject is a human.

By hereby reserving the right to proviso out or exclude any individual members of any such group, including any sub-ranges or combinations of sub-ranges within the group, that can be claimed according to a range or in any similar manner, less than the full measure of this disclosure can be claimed for any reason. Further, by hereby reserving the right to proviso out or exclude any individual substituents, analogs, compounds, ligands, structures, or groups thereof, or any members of a claimed group, less than the full measure of this disclosure can be claimed for any reason. Throughout this disclosure, various patents, patent applications and publications are referenced. The disclosures of these patents, patent applications and publications in their entireties are incorporated into this disclosure by reference in order to more fully describe the state of the art as known to those skilled therein as of the date of this disclosure. This disclosure will govern in the instance that there is any inconsistency between the patents, patent applications and publications cited and this disclosure.

For convenience, certain terms employed in the specification, examples and claims are collected here. Unless defined otherwise, all technical and scientific terms used in this disclosure have the same meanings as commonly understood by one of ordinary skill in the art to which this disclosure belongs.

Embodiments of the invention are directed to a devices, systems, and methods for measuring the tautness and elasticity of skin. The torsionometer includes a rigid disk having an upper and a lower surface. The lower surface includes an adhesive and the upper surface includes one or more marking. The torsionometer is used by adhering the torsionometer to the skin of a subject and twisting the torsionometer. The degree of movement provides a measurement of the taughtness and elasticity of the skin of the patient. In some embodiments, the torsionometer may be part of a system that includes an optical sensor operably associated with processor. The optical sensor may monitor movement of the markings on the upper surface of the torsionometer and the processor may use this information to measure the tautness of skin based on the amount of rotation, torque, rotational force, acceleration, and the like during return after the torsionometer is released, or other measurement that can provide a measurement of and elasticity. In further embodiments, the torsionometer may be part of a device that measures rotation of the torsionometer using a sensor, such as a optical encoder, torque meter, or other sensor capable of measuring rotation, torque, rotational force, acceleration, and the like.

Figure 2:
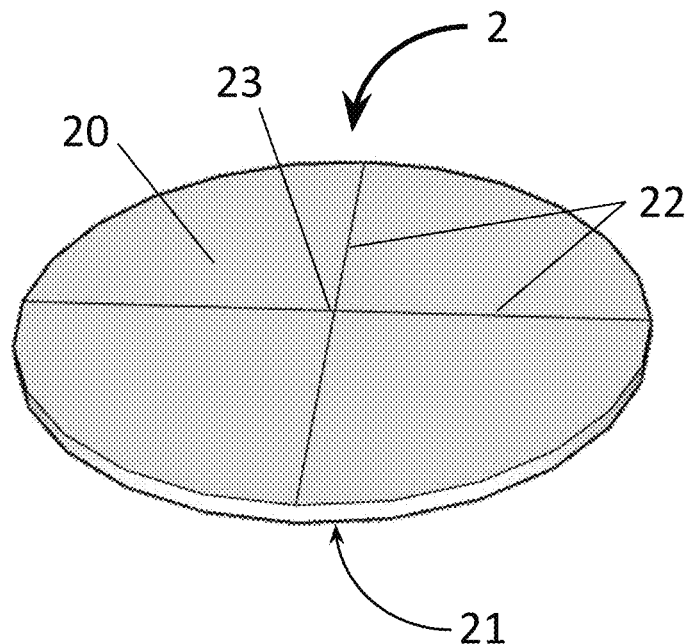
FIG. 2 is a diagram illustrating one example of a skin torsionometer embodied by the invention.
Figure 3:
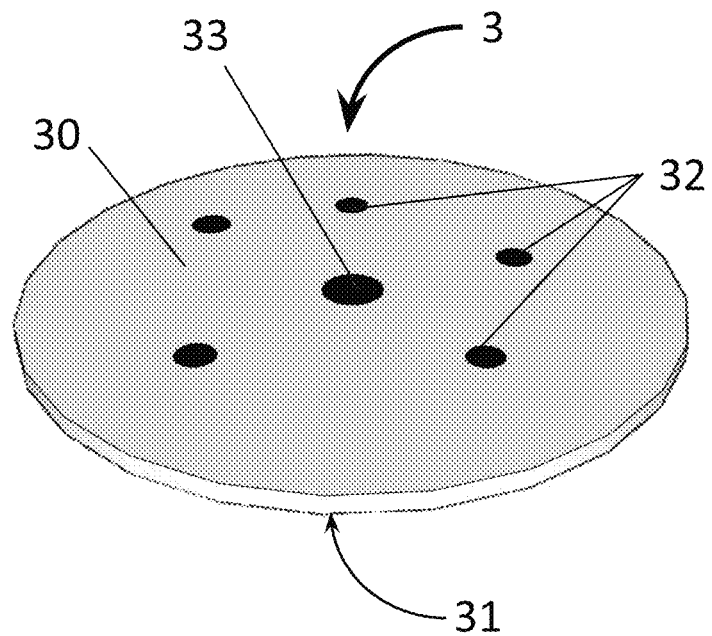
FIG. 3 is a diagram illustrating one example of a skin torsionometer embodied by the invention.

FIGS. 1-3 show various examples of the skin torsionometer. FIG. 1 shows a skin torsionometer 1, having an upper surface 10 and a lower surface 11, and a marking 12 on the upper surface 10. Similarly, FIG. 2 shows a skin torsionometer 2, having an upper surface 20 and a lower surface 21, and markings 22 is on the upper surface 20. FIG. 3 shows a skin torsionometer 3, having an upper surface 30 and a lower surface 31, and various markings 32 on the upper surface. The markings 12, 22, 32 provide a means for observing the torsion of the skin when the skin torsionometers 1, 2, 3 are rotated on the skin. For example, rotation of the skin torsionometer 1 of FIG. 1 can be observed and measured based on the change in angle of the marking 12 at the center 13 of the torsionometer 1 as the torsionometer 1 is rotated. In various embodiments, the change in angle may be observed as the torsionometer 1 is rotated, and in some embodiments, the skin may be marked at the location of the marking 12 at a first position before the torsionometer is rotated. The markings 22 on torsionometer 2 of FIG. 2 can be used in the same way to observe the change in angle of the torsionometer 2 at the center 23 of the torsionometer.

In certain embodiments, the torsionometer may include markings that allow for multiple, simultaneous calculation of the degree of rotation, the recoil speed, return velocity, acceleration, angular velocity, and the like or combinations thereof. For example, FIG. 3 illustrates a torsionometer 3 having a series of markings 32 on an upper surface 30 that are located at various distances from a center marking 33. The lower surface 31 can be designed as discussed above to adhere to the skin of the subject. In use, the computing device configured for image capture may align images based on the center marking 33 and identify a resting position and a rotated position of the torsionometer for each of the series of markings 32. The degree of rotation, the recoil speed, return velocity, acceleration, angular velocity, and the like or combinations thereof can be determined for each marking of the series of markings independently, and the final calculation can be an average of these measured values.

The torsionometers 1,2 of various embodiments may be of any diameter sufficient to allow the user to hold the torsionometer 1,2 against the skin and rotate it against the resistance of the skins inherent elasticity. For example, in some embodiments, the torsionometer 1,2 may have a diameter of about 1 inch (about 2.5 centimeters (cm)) to about 4 inches (about 10.2 cm) or about 1.5 inches (about 3.8 cm) to about 3 inches (about 7.6 cm) or any individual diameter or range encompassed by these example ranges, and in certain embodiments, the torsionometer 1,2 may have a diameter of about 2.2 inches (about 55 cm).

The lower surface 11,21 of the torsionometer 1,2 may include an adhesive to hold the torsionometer 1,2 on the skin of the patient during testing. Embodiments encompass nearly any adhesive. For example, the adhesive may be an adhesive compound, such as silicone adhesives, rubber adhesives, polyurethane adhesives, or hydrocolloid blended with adhesives such as polyisobutylenes or styrene-soprene-styrenes. The adhesive may generally be designed to balance internal cohesion or shear as well as tack and peel strength to provide sufficient adhesive strength to enable it to stick to objects, including human skin and allow for rotation of the torsionometer 1,2 without releasing during use, but that can be released from the skin following use without causing discomfort to the patient after use. In some embodiments, the adhesive may be reusable. In other embodiments, the adhesive may be applied in layers, for example, the adhesive may be layers of double-sided medical tape so that after each use the user may remove a layer of the tape exposing a fresh layer of adhesive.

In some embodiments, the lower surface 11,21 of the torsionometer 1,2 may be textured to increase the surface area of the lower surface 11,21. For example, in some embodiments, dimples or bumps can be provided on the lower surface 11,21 of the torsionometer 1,2, and in other embodiments, the lower surface 11,21 may include a series of ridges, waves, or paddles extending radially from the center of the torsionometer 1,2. The ridges, waves, or paddles may be sufficiently large to hold the torsionometer 1,2 to the skin of the subject without breaching the skin of the subject.

Figure 4:
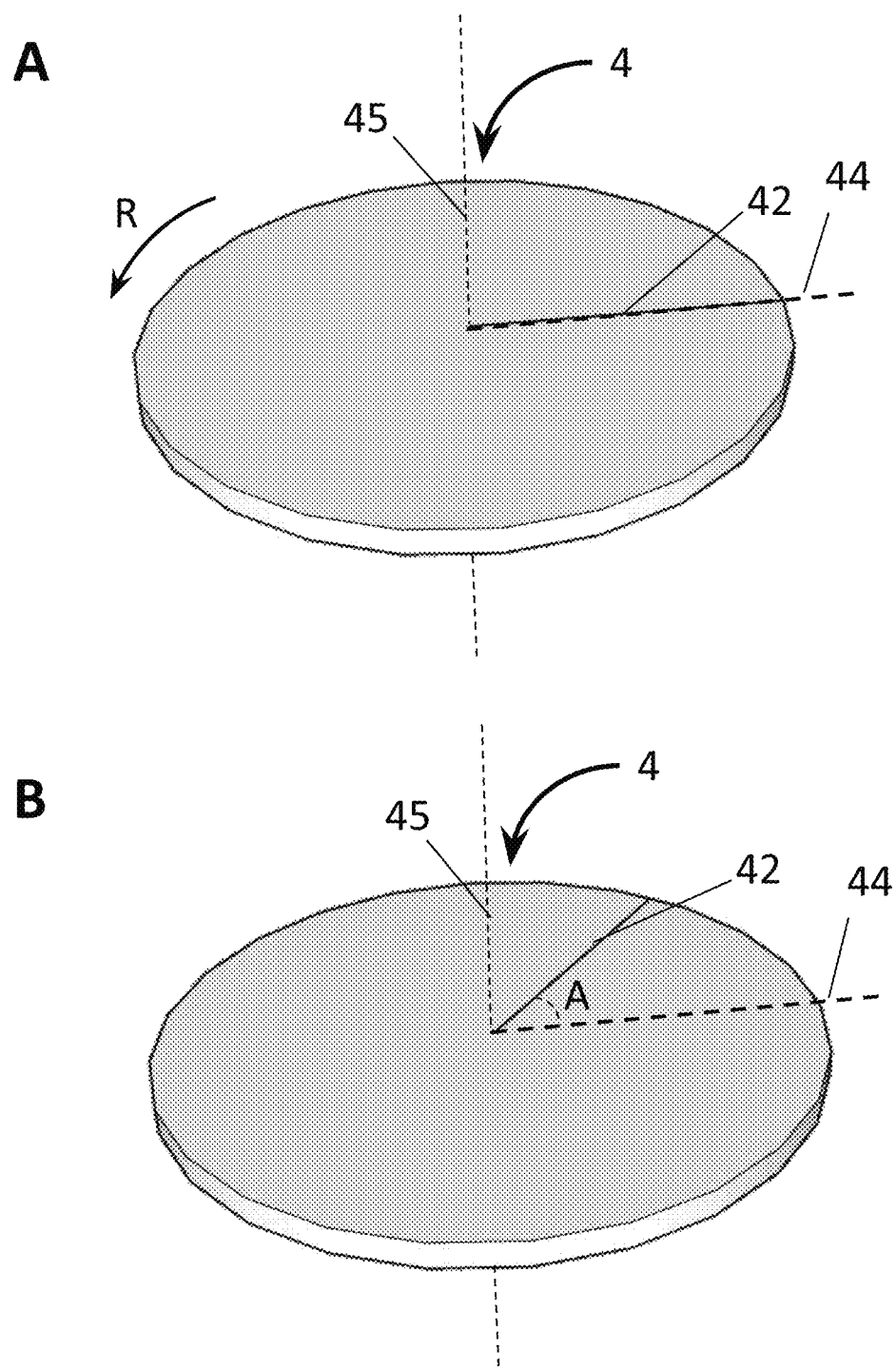
FIG. 4 is a diagram illustrating one example of a system including a skin torsionometer embodied by the invention and a computing device configured to capture images.

FIG. 4A-B illustrates the change in angle observed during use of the torsionometer. Panel A of FIG. 4 shows the torsionometer 4 of FIG. 1 in a first position. The position of the marking 42 is illustrated by the dashed line 44. The torsionometer 4 is rotated about a center axis 45 as indicated by the arrow R. Panel B shows the torsionometer 4 in the second position after rotation as indicated by the change in position of the marking 42. The torsionometer is rotated against the tautness and elasticity of the skin. Therefore, the change in angle A at the center of the torsionometer 4 provides a measure of the tautness and elasticity of the skin. For example, a change in angle A of 1 degrees or less, a change in angle A of 15 degrees, a change in angle A of 30 degrees, and a change in angle A of less than 45 degree may indicate different tightness in the skin.

The change in angle A may provide evidence of the amount and health of the elastin and collagen in the skin. Healthy skin with abundant elastin and collagen may exhibit a change in angle A of about 1 degree to 5 degrees or less and return upon release of the torsionometer of less than about 1 second, less than about 0.5 seconds, or less than about 0.1 seconds. Aged or damaged skin with lower concentrations of healthy elastin and collagen may exhibit a change in angle A of up to about 45 degrees and return upon release of the torsionometer of up to about 20 seconds, about 5 to about 20 seconds, about 8 to about 15 seconds, or any individual time or range encompassed by these example ranges. In some embodiments, the torsionometer may be used to document the effect of skin care products that are formulated to improve the tautness, firmness, and elasticity of skin. For example, a subject may use the torsionometer before administering a skin care product to provide a baseline tautness and elasticity. The subject may administer the skin care product and use the torsionometer to document any improvement is tautness, firmness, and elasticity based on a change in angle A from the baseline measurement. In some embodiments, the subject mays use the torsionometer to measure skin elasticity or tightening after exposure to, for example, the Sun or other environmental conditions, after treatment with medical devices, or to monitor changes in skin taughtness after surgery.

Other embodiments are directed to systems for measuring the tightness of skin. Such systems may generally include a torsionometer 1,2 such as those described above and a device for measuring the degree of rotation of the torsionometer 1,2, the acceleration or rate of return of the torsionometer 1,2 upon release, or any measure of movement of the device that can be used to determine the tightness of skin. Such measurements can be obtained using various devices and by various means. For example, such measurements can be obtained using accelerometers associated with the torsionometer 1,2, or in other embodiments, such measurements can be obtained by monitoring the movement of the torsionometer 1,2 with a secondary device such as a smartphone or tablet. Measurements can be obtained by monitoring, for example, change in light wavelength, magnetic response, phase retardation, ultrasound echo processes, optical laser, or comparing video or still images taken at various times during use of the torsionometer.

Figure 4C:
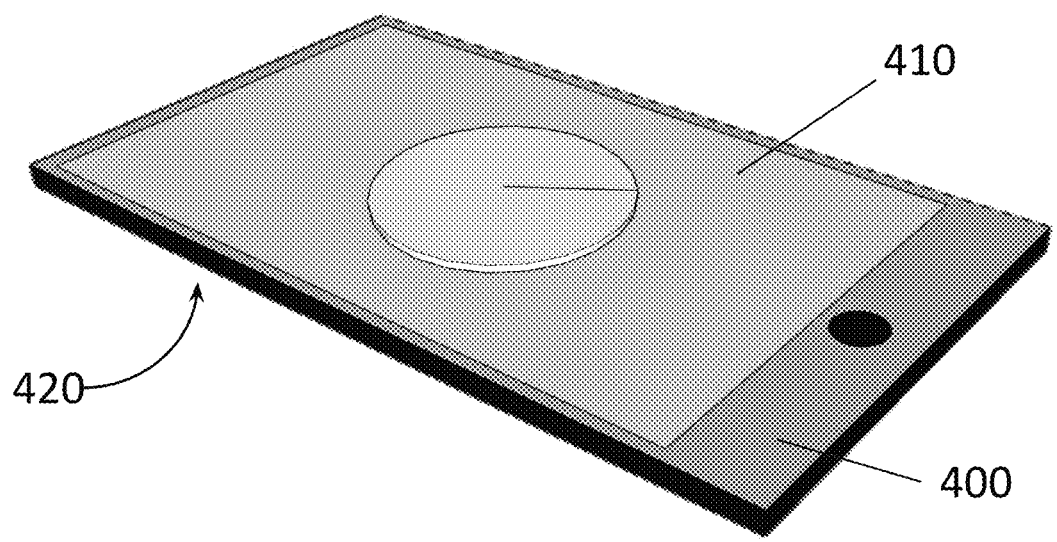
Figure 4C:
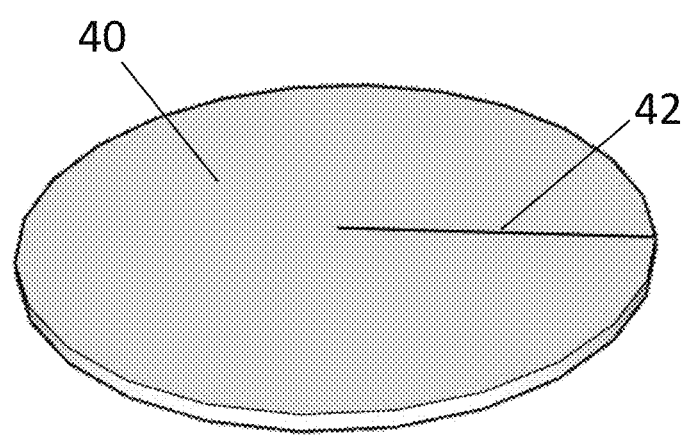

Data can be collected and aggregated using, for example, WiFi, Bluetooth, or other wireless network, and stored in a separate computing device to allow for analysis of groups of patients results. Various embodiments include of such systems are illustrated in FIG. 4C. Such systems may include a skin torsionometer 40 such as those discussed above have one or more markings 42, and a computing device 400 communicatively coupled to a camera, video camera, or other image data capturing means such as a smartphone or tablet having a camera 420 and a display 410. In use, the skin torsionometer 40 may be adhered to the skin of a subject and the handheld device 400 may be used to capture an image of the skin torsionometer 40 in the first position. The torsionometer 40 may be rotated to a second position and the computing device 400 may be used to capture a second image of the torsionometer 40 in the second position. A processor associated with the computing device 400 may compare the images and calculate the change in angle at the center of the torsionometer 40. The change in angle A at the center of the torsionometer 4 provides a measure of the tautness and elasticity of the skin.

In some embodiments, the system may include an app that can be downloaded on the handheld device and provides computer readable instructions for the processor of the handheld device to capture one or more still or video images using the computing device 400 camera 420, identify the torsionometer 40 and/or the markings 42 on the torsionometer 40, and calculate the change in angle A at the center of the torsionometer, the acceleration and/or rate of release of the torsionometer 40, and the like and combinations thereof, and display the change in angle A and/or measurement of skin tightness on the display 410 of the computing device 400. In some embodiments, the computer readable instructions may further cause the processor to display the still or video images captured by the camera 420 on the display 410.

In some embodiments, the torsionometer may be associated with a device specifically designed to measure the amount of rotation, rotational force, acceleration during return after the skin torsionometer is released or other measurement that can provide a measurement of and elasticity. For example, the torsionometer 5a may be operably attached to an optical sensor 530.

Figure 5A:
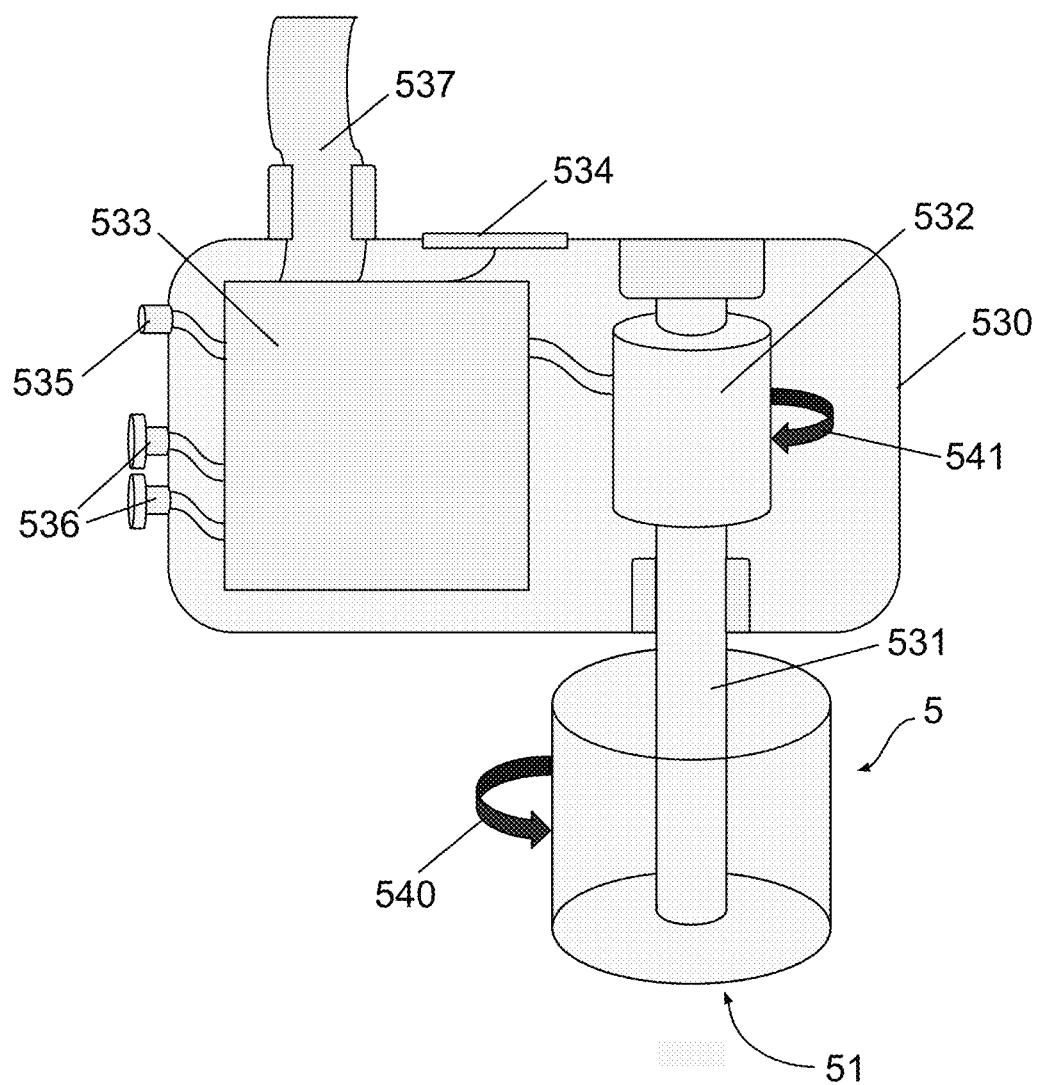
FIG. 5A is a diagram illustrating one example of a device including a torsionometer.

As illustrated in FIG. 5A, the torsionometer 5 may have a substantially cylindrical shape with a lower surface 51 designed and configured to adhere to skin using any of the means for adherence described above. The torsionometer may be sized to accommodate handling be a user, allowing the user to rotate the torsionometer and release it without interrupting the return rotation. The torsionometer 5 may be rotationally attached to a housing 530 by, for example, a rotatable shaft 531 that is operable connected to a sensor 532. Such devices may further include a processor 533, and various displays 534, indicator lights 535, and buttons 536. The device may further include a means for transmitting data acquired to a larger processor or computer, such as a cord, connector, or dongle 537.

Figure 5B:
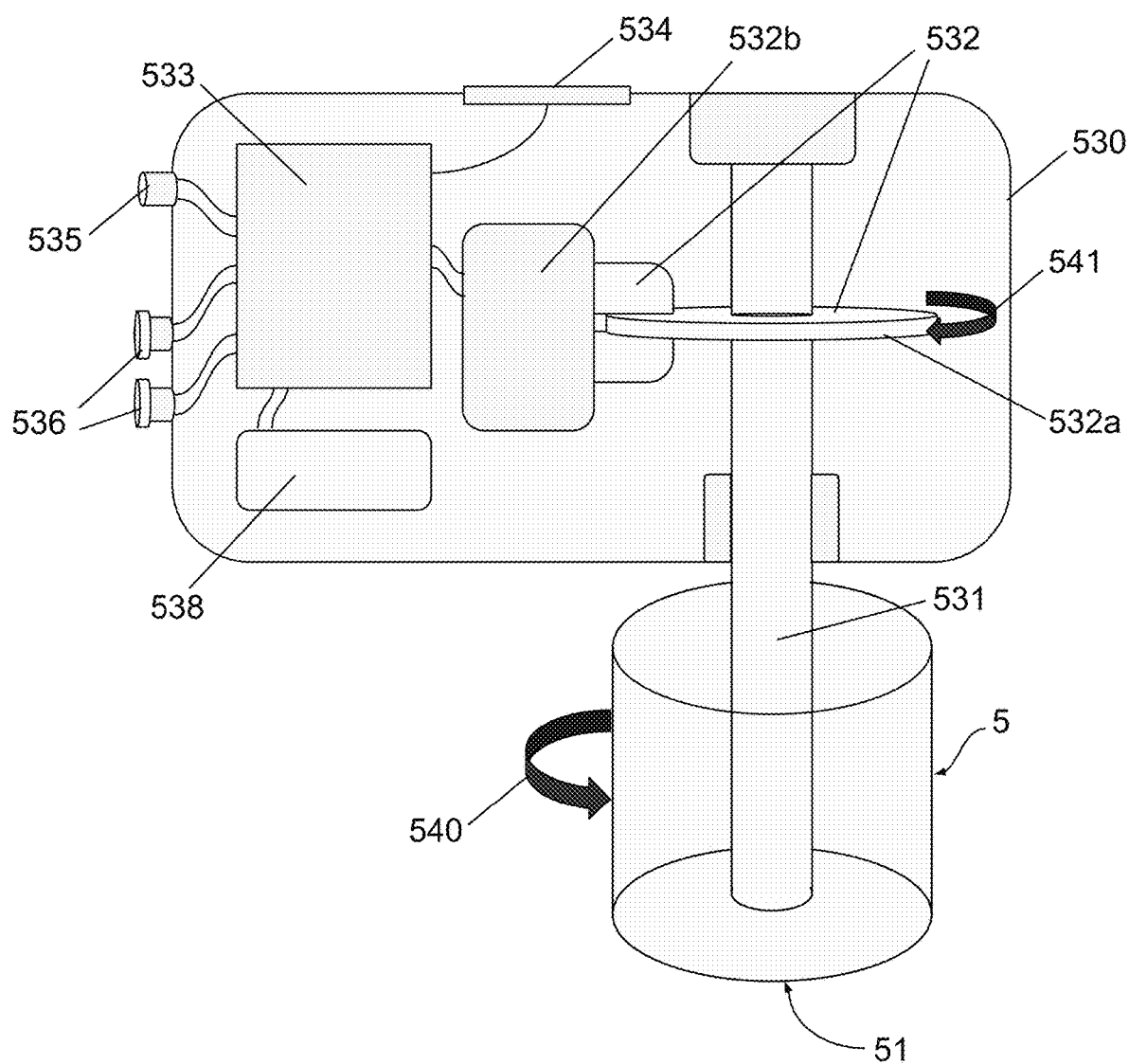
FIG. 5B is a diagram illustrating one example of a device including a torsionometer.

FIG. 5B is another torsionometer containing device. In FIG. 5A, the torsionometer 5 may have a substantially cylindrical shape with a lower surface 51 designed and configured to adhere to skin using any of the means for adherence described above. The torsionometer 5 may be rotationally attached to a housing 530 by, for example, a rotatable shaft 531 that is operable connected to a sensor 532. In such embodiments, the sensor 532 may include an optical encoder 532a. In some embodiments, the optical encoder 532a may be, for example, a slotted photo interrupter or opto-interrupter. Such optical encoders 532a may include markings as described above and an optical sensor 532b may measure, for example, recoil speed, return velocity, acceleration, angular velocity, and the like, by monitoring the position of the marks over time. In certain embodiments, the optical encoder 532a may include alternating slots. When an optical sensor 532b passes a beam of light through the optical encoder creating changes in conduction of the photo transistor/diode as the optical encoder 532a rotates, breaking the beam. In other embodiments, the optical sensor 532b may emit light onto one side of the optical encoder 532a and detect the reflected light. In various embodiments, the optical sensor may be an Arduino optical sensor or other commercially available optical sensor, a camera, video camera, smart phone, and the like, and combinations thereof.

As in FIG. 5A, such devices may further include a processor 533, and various displays 534, indicator lights 535, and buttons 536. The device may further include a means for transmitting data acquired to a larger processor or computer, such as a cord, connector, or dongle. However, in some embodiments, the device may include hardware 538 for transmitting data by, for example, WiFi, Bluetooth, or other wireless network.

In use, the lower surface 51 of the torsionometer 5 may be adhered to the skin of a patient. The torsionometer 5 may be rotated, as indicated by arrow 540, rotating the rotatable shaft 531 while the sensor housing 530 and associated optical sensor 532 remains static. When maximum rotation has been achieved, the torsionometer 5 may be released allowing the torsionometer 5, underlying skin, and rotatable shaft 531 to rotate in the opposite direction, as indicated by arrow 541, returning to its original position. The optical sensor 532 capture data relating to the amount of rotation, torsion, rotational force, acceleration, and the like. The processor 533 may calculate the amount of rotation, torsion, rotational force, acceleration and the like and display data relating to these calculations on the display 534 and/or transmit this data to another processing device by a cord 537 or wireless hardware 538. In some embodiments, an indicator light 535 may turn on indicating that sufficient force has been applied by rotation of the skin in direction 540 to produce reproducible results. Various buttons 536 may control any aspect of the use of the device, such as rotation of the torsionometer 5, release of the torsionometer 5, display of results, adherence of the torsionometer 5 to skin, suction which allows the torsionometer 5 to adhere to skin, or any other function of the device.

In some embodiments, the device may further include a vacuum pump operably connected to the torsionometer. The vacuum pump may be configured to adhere the torsionometer by applying suction to the skin. In some embodiments, the vacuum pump may be operably connected to a vacuum gauge that measure suction applied to skin when the torsionometer is adhered to the skin. The vacuum gauge may be operably connected to the processor and may transmit suction data to the processor where it can be used to calculate the density of skin adhered to the torsionometer.

Figure 6:
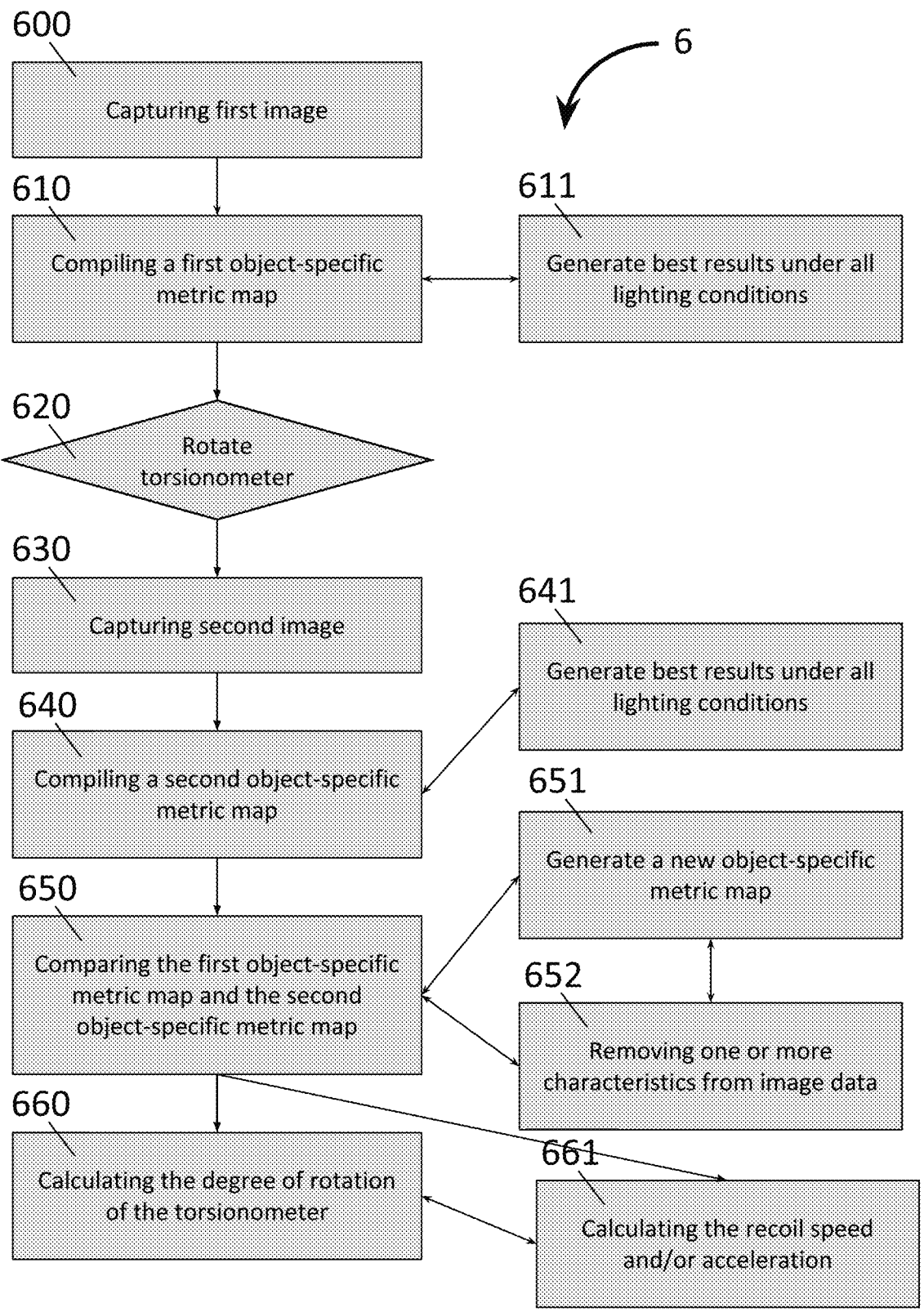
FIG. 6 is a block diagram showing methods encompassed by the invention.

FIG. 6 shows an example method 6 for determining the rotation, the recoil speed, return velocity, acceleration, angular velocity, and the like or combinations thereof of the torsionometer. In some embodiments, a computing device may be configured to operate as an image processing engine, on which each of the following steps can be executed. In other embodiments, an optical sensor may be used to capture image data relating to the rotation, torque recoil speed, return velocity, acceleration, angular velocity, and the like or combinations thereof of the torsionometer.

All commercially suitable computing devices are contemplated for use with the inventive subject matter, including for example, a mobile phone, a tablet computer, a laptop computer, an electronic book reader, a camera, a video camera, a smart phone, a kiosk, or any other device having a sensor and a user interface.

Step 600 includes capturing first image data of the scene containing the torsionometer. This image data is received by the computing device or a different device communicatively coupled to the computing device such as a camera, video camera, or other image data capturing means. The term "image data" is used broadly to include, among other things, a still image, a video frame, a video frame delta, a video, a computer rendered image, a computer-generated image or graphic, a projection, printed matter, an on-screen image, medical images, or other types of images.

Step 610 includes compiling a first object-specific metric map of the torsionometer from the image data. The metric map may include at least a portion of the image data representing the torsionometer and may include mapping of color values, metric values (e.g., scalars, vectors, etc.), spacing, and the like and combinations thereof. The initial object-specific metric map can be generated in an empirical, data-driven fashion. In some embodiments, the object-specific metric map should be lighting invariant, such that the torsionometer may be recognized regardless of the lighting conditions under which the image data is generated. For example, as lighting conditions are varied, the imaging processing engine can execute a desired image processing algorithm on the image data to derive descriptors. The engine can further compile which RBG values remain invariant as the lighting is changed and yield the best results for high quality descriptors. The engine can further construct (e.g., automatically, manually, semi-automatically, etc.) the object-specific metric map (step 611) that indicates how the RGB should be mapped to metric values and how to generate best results under all lighting conditions.

The first object-specific metric map of the first image data may include, for example, a circumference of the torsionometer, the location of the center of the torsionometer, and the location of any markings on the torsionometer.

In step 620, the user rotates the torsionometer against the elasticity of the skin to which the torsionometer is attached. Rotating is continued until the rotation meets sufficient resistance to stop rotation without injuring the subject.

Step 630 includes capturing a second image data of the scene containing the torsionometer in fully rotated position, and step 640 includes compiling a second object-specific metric map of the torsionometer from the image data. Compiling of the second object-specific metric map can be carried out in the same manner as compiling the first object-specific metric map, and can include constructing the object-specific metric map (step 641) that indicates the best results under all lighting conditions. The second object-specific metric map of the second image data may include, for example, a circumference of the torsionometer, the location of the center of the torsionometer, and the location of any markings on the torsionometer.

Step 650 includes comparing the first object-specific metric map and the second object-specific metric map. In step 650, the image processing engine can compare or contrast each individual object's specific map. Each map can be treated has having a functional complexity with respect to the computation steps necessary to convert RGB values to individual metrics. Complexity might be measured by size of look up table, number of calculations, or other factors. A form of principle component analysis could operate on the various dimensions (e.g. constants, scales, operations, etc.) of the map's functions across the class of objects to reduce the features of the collective map's complexity. Step 650 (and any other step of the inventive subject matter) can be carried out via the image processing engine, or another engine, server or platform, distal or local.

The first or second object-specific metric map compiled in steps 610 and 640 can be adjusted to generate a new object-specific metric map in accordance with step 651. For example, the initial map can be adjusted by tuning the function in a manner effective to enhance differentiation of descriptors generated by the implementation of the feature identification algorithm (e.g. SIFT, FAST, etc.) as executed on the portion of the image. This can be accomplished, for example, via acceptance of user input that alters at least some of the metric values within the initial object-specific metric map, via an image processing engine recommendation of modifying one or more of the metric values to increase a confidence of a descriptor, via an image processing engine's automatic adjustment of one or more of the metric values of an initial object-specific metric map, or any other commercially suitable process. For example, the first or second object-specific image maps may be manipulated to align the orientation of the first and second object-specific image maps. Aligning the orientation of the first and second image maps may include, for example, aligning centers of the image maps, enlarging or reducing the size of the torsionometers in the image map to make the image maps equally sized and dimensioned, and the like and combinations thereof.

In some embodiments, the method may include Step 652 in which one or more characteristics can be removed from image data at the pixel-level to allow for increased and more consistent differentiation of the values in the image data. For example, image data may comprise various characteristics that hinder a differentiation of colors on a pixel-level basis (e.g., illumination color, illumination geometry, surface reflectance, surface geometry and view-point, diffuse reflection, specular reflection, etc.). Removal of, or zeroing out, one or more of the characteristics can improve the effectiveness of image analysis or feature identification algorithms on an image as many algorithms assume perfect diffuse reflections and consider locations of specular reflection to be outliers. Such assumption reduces the robustness of these algorithms since the presence of specular reflection is inevitable in most real-world environments.

Step 660 includes calculating the degree of rotation of the torsionometer on the aligned first and second image maps. Calculating can be carried out by any means that results in a degree of rotation of the torsionometer.

In some embodiments Step 661, calculating the recoil speed, return velocity, acceleration, angular velocity, and the like or combinations thereof of the torsionometer from the rotated position to the first position. Calculating the recoil speed, return velocity, acceleration, angular velocity, and the like or combinations thereof can be carried out using various means and, in particular embodiments, the calculating the recoil speed, return velocity, acceleration, angular velocity, and the like or combinations thereof can be carried out by capturing video image, identifying a first, resting position, identifying a rotated position, and determining the amount of time required for the torsionometer to return to a second, resting position from the rotated position. In some embodiments, the second, resting position may be the same position as the first resting position, and in some embodiments, the second, resting position may be a position in which the torsionometer has stopped rotating away from the rotated position that is not the same as the first, resting position. Thus, the computing device configured for image capture may identify a final resting position on skin that has lost elasticity.

Such methods may include the step of displaying the degree of rotation, the recoil speed, return velocity, acceleration, angular velocity, and the like and combinations thereof. The degree of rotation can be displayed as a number such as, for example, 1 degree, 15 degrees, 30 degrees, or 45 degrees, and the recoil speed, return velocity, acceleration, angular velocity, and the like or combinations thereof, can be displayed as a numerical value such as, less than about 0.1 second, less than about 0.5 seconds and up to about 20 seconds, less than about 0.2 seconds to about 15 seconds, about 1 to about 15 seconds, about 1.5 to about 10 seconds, or any individual time or range encompassed by these example ranges. In other embodiments, the display may provide an independent measurement providing the user with an indication of the elasticity, firmness, taughtness, and/or overall health of the skin. For example, the calculations obtained from methods described above can be combined and weighted, and the skin can overall elasticity, firmness, or taughtness can be measured on a 1-10 or 1-5 scale. The app may contain instructions for understanding the measured number and display examples of skin falling within the applicable measurement.

Figure 7:
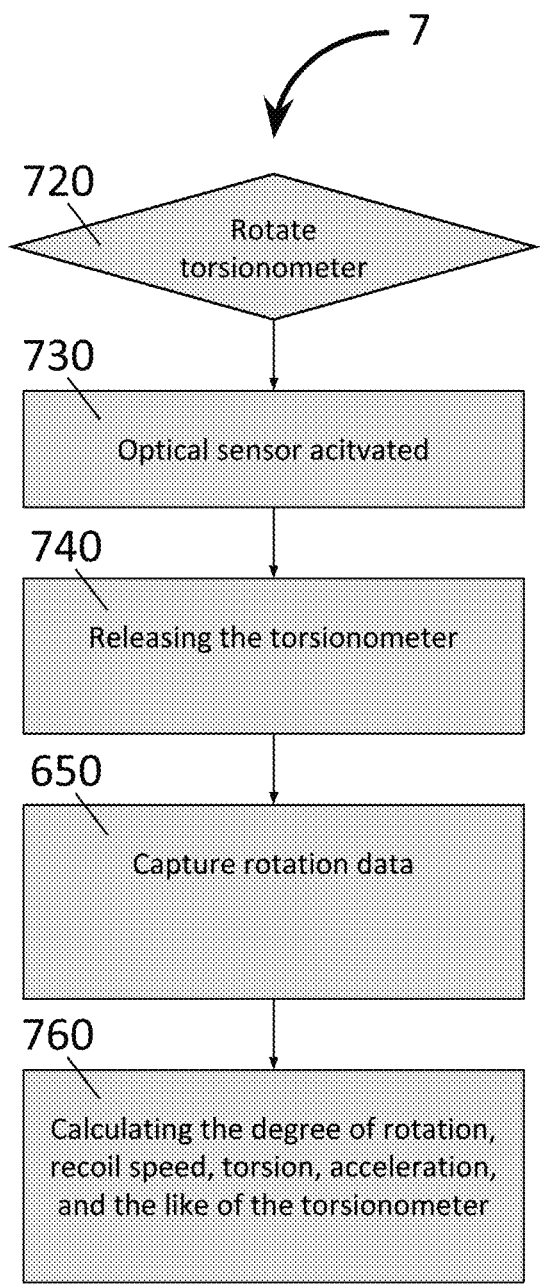
FIG. 7 is a block diagram showing method encompassed by the invention.

Additional embodiments include methods for measuring the elasticity of skin using the device illustrated in FIG. 5 and described above. As illustrated in flow diagram 7 in FIG. 7, the user rotates the torsionometer against the elasticity of the skin to which the torsionometer is attached in step 720. Rotating is continued until the rotation meets sufficient resistance to stop rotation without injuring the subject. The rotating the torsionometer causes an optical sensor associated with the torsionometer to rotate to a first position.

In Step 730, the optical sensor is activated by rotation of the torsionometer. Step 740 includes releasing the torsionometer, causing the torsionometer in the opposite direction of the rotation in Step 720, and reversing twisting of the underlying skin. The sensor may capture data, Step 750 relating to the amount of rotation, rotational force, acceleration, and the like, by monitoring transmission of light through slits in the optical encoder. In Step 760, recoil speed, return velocity, acceleration, angular velocity, and the like may be calculated by a processor associated with the optical sensor. In some embodiments, the processor may be associated directly with the optical sensor and these data may be transmitted to a processor that can display, save, and/or compile the data. In other embodiments, the optical sensor may transmit raw data to a processor that can use the data to calculate recoil speed, return velocity, acceleration, angular velocity, and the like, display, save and/or compile these data.

As in FIG. 6, such methods may include the step of displaying the degree of rotation, the recoil speed, torsion, return velocity, acceleration, angular velocity, and the like and combinations thereof. The degree of rotation can be displayed as a number such as, for example, 1 degree, 15 degrees, 30 degrees, or 45 degrees, and the recoil speed, return velocity, acceleration, angular velocity, and the like or combinations thereof, can be displayed as a numerical value such as, less than about 0.1 second, less than about 0.5 seconds and up to about 20 seconds, less than about 0.2 seconds to about 15 seconds, about 1 to about 15 seconds, about 1.5 to about 10 seconds, or any individual time or range encompassed by these example ranges. In other embodiments, the display may provide an independent measurement providing the user with an indication of the elasticity, firmness, taughtness, and/or overall health of the skin. For example, the calculations obtained from methods described above can be combined and weighted, and the skin can overall elasticity, firmness, or taughtness can be measured on a 1-10 or 1-5 scale. The app may contain instructions for understanding the measured number and display examples of skin falling within the applicable measurement.

In some embodiments, elasticity can be measured as a function of the modulus of elasticity, e.g. Young's modulus. Young's modulus can be calculated as follows:

$$E = V^2 \rho \left[ \frac{(1+\mu)(1-2\mu)}{(1-\mu)} \right] \text{ Wherein;}$$

$E$ = Modulus of Elasticity
$V$ = Velocity
$\rho$ = Density
$\mu$ = Poisson's Ratio Density ($\rho$) can be calculated as follows:

$$\rho = \frac{m}{V} \text{ Wherein;}$$

$\rho$ = density $m$ = mass $V$ = volume

Density can be constant based on the average density of skin in the region tested, for example, the density of skin on the forehead or the density of skin on the forearm. In other embodiments, density can be calculated by irradiating the skin and detecting, for example, absorbance or scattering. Similarly, Poisson's ratio (u), which is calculated as follows:

$$\mu = \frac{\left(\frac{\Delta l}{l}\right)}{\left(\frac{\Delta w}{w}\right)} \text{ Wherein:}$$

$\mu$ = Poisson's Ratio $\Delta l$ = Change in Length $l$ = Length $\Delta w$ = Change in Width $w$ = Width can be a constant based on mechanical testing of skin. In some embodiments, Poisson's ratio can be calculated based on the change in length and width of the skin when twisted under the torsionometer.

In some embodiments, the app may store various measured values such as, the degree of rotation, recoil speed, acceleration, and the like and combinations thereof, in a transitory storage medium. In some embodiments, the app may display these measurements in, for example, graphically or on a spreadsheet. In particular embodiments, the app may sequentially store and transmit various measured values to a repository, where the data can be used by formularies and skin care professionals to monitor the effect of skin care products and treatment regimens. For example, the data may be used to compile patient reported outcomes for skin care products and treatment regimens under review by the FDA.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples.

Example 1

Figure 8:
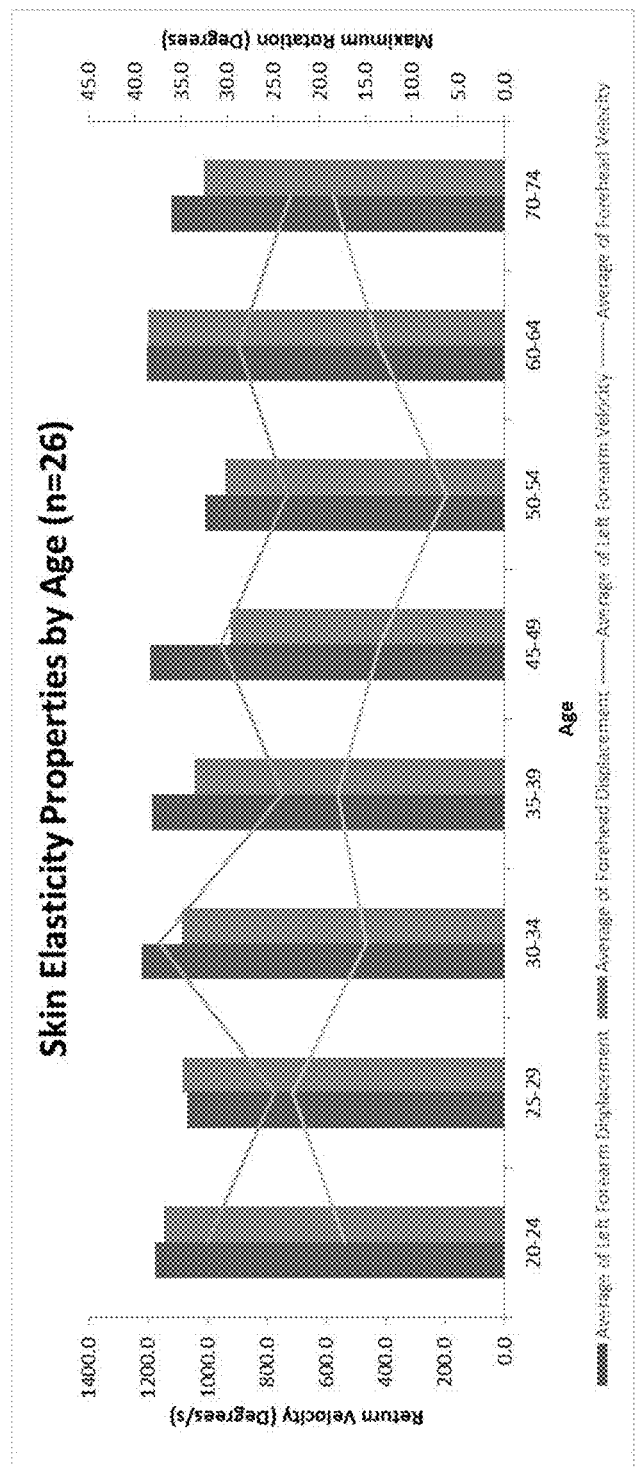
FIG. 8 is a bar and line graph illustrating example data collected using the device of embodiments.

The elasticity of forearm and forehead skin was determined using the torsionometer device described above for 26 people aged 20-74. Elasticity and tautness was determined based on maximum rotation in degrees, "displacement," the current standard for determining skin elasticity, and return velocity after the release of the torsionometer from maximum rotation. These data are plotted in FIG. 8. The change in maximum rotation and return velocity illustrated in FIG. 8 exhibit similar changes in magnitude across age ranges.

The invention claimed is:

1. A method for measuring tautness of skin comprising:
providing a torsionometer comprising a shaft and a lower surface;
providing a housing for rotatably supporting the shaft for rotational movement of the torsionometer relative to the housing;
providing a sensor mounted to the housing and operably connected to the torsionometer to detect rotational movement of the torsionometer relative to the housing and connected to provide measured data to a processor;
adhering the lower surface to the skin;
rotating the torsionometer to thereby twist the skin until resistance from the twisting of the skin stops rotation of the torsionometer;
releasing the torsionometer to freely rotate under torque from the deformed skin;
measuring, by the sensor and the processor, recoil angular velocity of the torsionometer relative to the housing and associated with the releasing of the torsionometer; and
determining, by the processor, the tautness of the skin based at least in part on the recoil angular velocity of the torsionometer.

2. The method of claim 1, further comprising calculating, by the processor, a Young's modulus of the skin based on the recoil angular velocity.

3. The method of claim 1, further comprising measuring, by the sensor and the processor, a degree of rotation of the skin.

4. The method of claim 1, further comprising measuring, by the sensor and the processor, an acceleration of releasing of the torsionometer.

5. The method of claim 1, wherein the skin is facial skin, arm skin, or leg skin.

6. A device comprising:
a housing;
a torsionometer comprising a shaft and a lower surface adherable to skin, the shaft rotationally attached to the housing to allow rotation of the torsionometer relative to the housing, wherein rotation of the torsionometer relative to the housing causes twisting of the skin when the lower surface is adhered to the skin;
a sensor mounted to the housing and operably connected to the housing and the shaft to detect relative rotational movement between the torsionometer and the housing;
a processor connected to receive a measurement signal from the sensor;
wherein the sensor and the processor are configured to detect a recoil angular velocity of the torsionometer relative to the housing after: adhering the lower surface to the skin, rotating the torsionometer to thereby twist the skin until resistance from the twisting of the skin stops rotation of the torsionometer, and releasing the torsionometer to freely rotate under torque from the deformed skin.

7. The device of claim 6, wherein the sensor is selected from the group consisting of optical sensors, cameras, video cameras, smart phones, optical encoders, and combinations thereof.

8. The device of claim 6, wherein the sensor is an optical encoder.

9. The device of claim 6, further comprising a display, indicator lights, buttons, and combinations thereof.

10. The device of claim 6, further comprising hardware for transmitting data.

11. The device of claim 10, wherein the hardware for transmitting data is selected from the group consisting of cords, connectors, dongles, WiFi hardware, Bluetooth hardware, or other wireless network hardware, and combination thereof.

12. The device of claim 6, wherein the processor is configured to determine a Young's modulus of the skin.

13. The device of claim 6, wherein the torsionometer is cylindrical in shape.

14. The device of claim 6, further comprising a vacuum pump operably connected to the torsionometer and configured to adhere the lower surface to the skin by suction.

15. The device of claim 14, wherein the device further comprises a vacuum gauge operably connected to the vacuum pump and operably connected to the processor.

16. The device of claim 15, wherein the processor is configured to calculate a density of the skin adhered to the lower surface.

* * * * *